United States Patent
Wei et al.

(10) Patent No.: US 8,114,315 B2
(45) Date of Patent: Feb. 14, 2012

(54) PHPIT AND FABRICATION THEREOF

(75) Inventors: Kung-Hwa Wei, Hsinchu (TW); Yao-Te Chang, Yunlin County (TW)

(73) Assignee: National Chiao Tung University, Hsinchu (TW)

( * ) Notice: Subject to any disclaimer, the term of this patent is extended or adjusted under 35 U.S.C. 154(b) by 419 days.

(21) Appl. No.: 12/385,524

(22) Filed: Apr. 10, 2009

(65) Prior Publication Data

US 2010/0059714 A1    Mar. 11, 2010

(30) Foreign Application Priority Data

Sep. 10, 2008    (TW) .............................. 97134628 A

(51) Int. Cl.
*H01B 1/00* (2006.01)
*C08G 75/00* (2006.01)
(52) U.S. Cl. ....................... 252/500; 528/377
(58) Field of Classification Search ................ 252/500; 528/377
See application file for complete search history.

(56) References Cited

FOREIGN PATENT DOCUMENTS
WO    WO 2007090773 A1 *    8/2007

OTHER PUBLICATIONS

Chang et al., "Intramolecular Donor-Acceptor Regioregular Poly(3-hexylthiophene)s Presenting Octylphenanthrenyl-Imidazole Moieties Exhibit Enhanced Charge Transfer for Heterojunction Solar Cell Applications," Adv. Funct. Mater., 18, pp. 2356-2365 (2008).*
Chang, Yao-Te; Intramolecular Donor-Acceptor Regioregular Polythiophene Derivatives Exhibit Enhanced Charge Transfer and Hole Mobility for Solar Cell Applications; May 19, 2008; Conference: The 2$^{nd}$ conference in Center for Green Energy Technology; National Chiao Tung University, Hsinchu, Taiwan.

* cited by examiner

Primary Examiner — Mark Kopec
Assistant Examiner — Jaison Thomas
(74) Attorney, Agent, or Firm — Bacon & Thomas, PLLC

(57) ABSTRACT

The present invention provides PHPIT and fabrication thereof. PHPIT has a side-chain-tethered with hexylphenanthrenyl-imidazole polythiophene. The visible light absorption of the PHPIT/PCBM blend is enhanced by the presence of the electron-withdrawing hexylphenanthrenyl-imidazole. The PHPIT/PCBM blend experienced more-balanced electron and hole mobilities and solvability.

4 Claims, 7 Drawing Sheets

| Polymer blend annealed at 120°C | Voc (V) | Jsc (mA/cm2) | Fill Factor (%) | PCE (%) |
|---|---|---|---|---|
| PHPIT/PCBM (w/w=1:1) annealed for 20 min | 0.6 | 8.3 | 62 | 3.1 |
| PHPIT/PCBM (w/w=1:1) annealed for 30 min | 0.61 | 11.3 | 60 | 4.1 |

Figure 2

| Polymer blend annealed at 120□ | hole mobility($\mu_h$) (cm²/Vs) | electron mobility($\mu_e$) (cm²/Vs) | $\mu_e/\mu_h$ |
|---|---|---|---|
| P3HT/PCBM (w/w=1:1) annealed for 30 min | 1.8×10⁻⁶ | 2.5×10⁻⁵ | 13.8 |
| PHPIT/PCBM (w/w=1:1) annealed for 20 min | 6.6×10⁻⁶ | 1.6×10⁻⁵ | 2.4 |
| PHPIT/PCBM (w/w=1:1) annealed for 30 min | 1.8×10⁻⁵ | 3.7×10⁻⁵ | 2.0 |
| PHPIT/PCBM annealed for 45 min | 4.4×10⁻⁶ | 1.4×10⁻⁵ | 3.2 |

Figure 5

PHPIT AND FABRICATION THEREOF

BACKGROUND OF THE INVENTION

1. Field of the Invention

The present invention provides a polythiophene derivative polymer, particularly a polythiophene derivative polymer applied to solar cell.

2. Description of the Prior Art

In recent years, for the application of polymer to solar cell, there are several problems that have to be improved, such as insufficient light absorption range, shorter wavelength of adsorbed light (only about 700 nm), low charge transferring speed, and easy recombination phenomenon and so on.

Thus, there are many research results about the improvement of solar cell efficiency have been published in recent years. It means to use different annealing temperature and different time to reduce the resistance of components, or introduce the electrode having low work function as the technological means. On the other hand, there are few researches that discuss the introduction of different conjugated monomers to change the structure of polymer.

As for the polymerization of donor-acceptor polymer, for example, there is significant progress for the addition of polyfluorene on the main chain. The introduction of polyfluorene can change the highest occupied molecular orbital (HOMO) energy level but reduce electron mobility and hole mobility. Therefore the new introduced material can improve the electron and hole mobility and the efficiency.

Obviously, under the circumstance that the existing technology is unable to reach effective light absorption and charge transferring, it is more important for the research and development of the advanced material to the solar cell technology.

SUMMARY OF THE INVENTION

The present invention provides a polythiophene derivative polymer applied to solar cell and its fabrication method thereof. The hexyl group is introduced to the end of polymer on order to improve solvability of the polymer.

Moreover, the present invention provides a polythiophene derivative polymer applied to solar cell and its fabrication method thereof, such as a method for fabricating organic polymer of solar cell. The phenanthrenyl-1,3-imidazole group is introduced to the polymer for generating the donor-acceptor effect in intramolecular of polymers. The charge separation of molecule can accelerate the charge separation of polymer, and improve the photovoltaic conversion efficiency.

According to the above-mentioned description, a polythiophene derivative polymer is developed. This polythiophene derivative polymer has a side-chain tethered with hexylphenanthrenyl-1,3-imidazole polythiophene, and has a hexyl group at its end. The fabrication method comprises: Reacting 3,6-dibromophenanthrene-9,10-dione with 3-thiophenecarboxaldehyde, 4-hexylaniline, ammonium acetate, and acetic acid to form Compound 1 firstly.

Consequently, reacting Compound 1 with hexyl magnesium bromide and Ni(dppp)Cl$_2$ to form Compound 2. Then reacting Compound 2 with N-bromosuccinimide (NBS), tetrahydrofuran (THF), and acetic acid to form 2-(2,5-dibromothiophen-3-yl)-6,9-dihexyl-1-(4-hexylphenyl)-1H-phenanthro[9,10-d]-imidazole (HPIT). Finally, reacting HPIT with tetrahydrofuran, methyl magnesium bromide, and Ni(dppp)Cl$_2$ to form polymer for solar cell applications.

Therefore, the advantage and spirit of the invention can be further understood by the following detailed description and figures.

BRIEF DESCRIPTION OF THE DRAWINGS

The foregoing aspects and many of the attendant advantages of this invention will become more readily appreciated as well becomes better understood by reference to the following detailed description, when taken in conjunction with the accompanying drawings, wherein:

FIG. 2 shows the photovoltaic conversion efficiency for the embodiment of the present invention.

FIG. 5 shows the electron mobility, hole mobility, and their ratio of PHPIT/PCBM and P3HT/PCBM for different temperature keeping time.

DESCRIPTION OF THE PREFERRED EMBODIMENT

The present invention provides a polymer applied to solar cell and its fabrication method thereof. The 3,6-dibromophenanthrene-9,10-dione is prepared by a suitable method firstly. In an embodiment, N-bromosuccinimide (NBS) is dropped into a solution composed of 9,10-dihydrophenanthrene, tetrahydrofuran (THF), and acetic acid gradually, and agitate the mixture for 20 minutes. Add the saturated NaHCO$_3$, and use water to rinse the solution. Use ethyl acetate to extract the solution. Use MgSO$_4$ to dry the organic layer, and concentrate it to obtain 3,6-dibromo-9,10-dihydrophenanthrene. Then dissolve 3,6-dibromo-9,10-dihydrophenanthrene and chromic trioxide in acetic anhydride, and react at room temperature for several hours. Pour the solution into 1N HCl solution. Use ethyl acetate to extract the solution. Use MgSO$_4$ to dry the organic layer, and concentrate it to obtain 3,6-dibromophenanthrene-9,10-dione.

Figure 1:
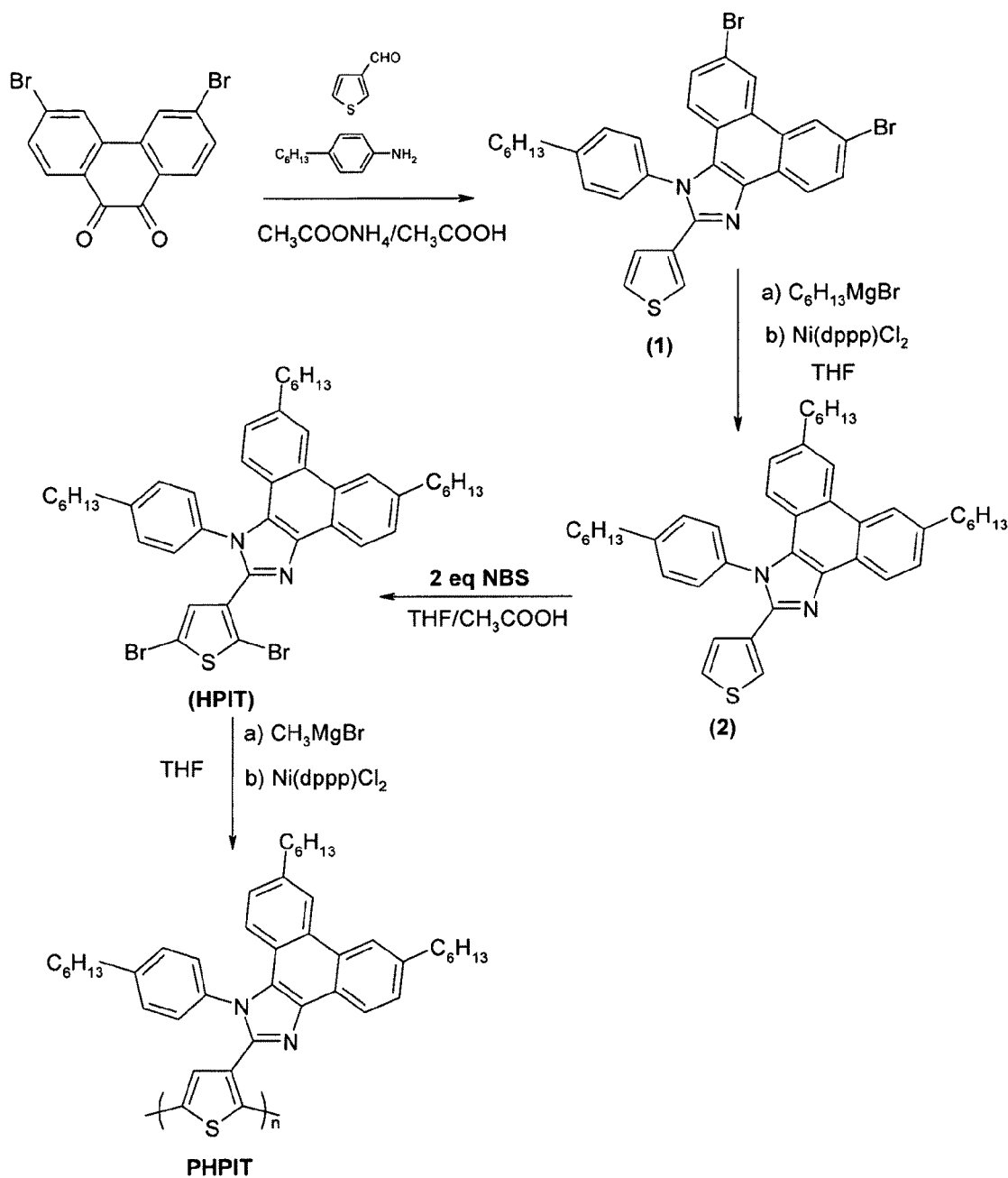
FIG. 1 shows the preparation process for the embodiment of the present invention.

Please refer to FIG. 1, after 3,6-dibromophenanthrene-9,10-dione is reacted with 3-thiophenecarboxaldehyde, 4-hexylaniline, ammonium acetate and acetic acid, separate the formed Compound 1 (6,9-dibromo-1-phenyl-2-(thiophen-3-yl)-1H-phenanthro[9,10-d]imidazole) from the products.

Then please refer to FIG. 1, after Compound 1 is reacted with hexyl magnesium bromide and Ni(dppp)Cl$_2$, separate the formed Compound 2 (6,9-dihexyl-1-(4-hexylphenyl)-3a,11b-dihydro-2-(thiophen-3-yl)-1H-phenanthro[9,10-d]imidazole) from the products.

As shown in FIG. 1, after Compound 2 is reacted with N-bromosuccinimide (NBS), tetrahydrofuran (THF) and acetic acid, separate the formed HPIT (2-(2,5-dibromothiophen-3-yl)-6,9-dihexyl-1-(4-hexylphenyl)-1H-phenanthro[9,10-d]-imidazole) from the products.

Then please refer to FIG. 1 again, after HPIT is reacted with tetrahydrofuran (THF), methyl magnesium bromide and Ni(dppp)Cl$_2$, PHPIT (poly(hexylphenanthrenyl-imidazole thiophene)) (poly[(2-(thiophen-3-yl)-6,9-dihexyl-1-(4-hexylphenyl)-1H-phenanthro[9,10-d]imidazole)]) is formed.

According to PHPIT prepared in the above-mentioned process, the solvability of polymer is improved, due to the introduction of three hexyl groups. Furthermore, after phenanthrenyl-1,3-imidazole group is introduced, the charges in molecule are separated due to the donor-acceptor effect, that can accelerate the charge separation of polymer and obtain more-balanced electron mobility and hole mobility, and improve the photovoltaic conversion efficiency.

Then, blend PHPIT and [6,6]-phenyl-$C_{61}$-butyric acid methyl ester (PCBM) to form a component. Thus, the structure of component prepared in the present invention is ITO/PEDOT:PSS/PHPIT:PCBM (1:1, w/w)/Ca/Al solar cell. And then, the measurement of photovoltaic current can be conducted, wherein the photovoltaic current density is altered with the keeping temperature.

Referring to the embodiment shown in FIG. 2, when the temperature is kept at 120° C., the best photovoltaic conversion efficiency can be obtained. When the temperature is kept for 20 minutes, the photovoltaic current density is 8.3 mA/cm$^2$ and the photovoltaic conversion efficiency is 3.1%. When the temperature is kept for 30 minutes, the photovoltaic current density is 11.3 mA/cm$^2$ and the photovoltaic conversion efficiency is 4.1%, which is increased 32% compared to the condition at 20 minutes.

Figure 3:
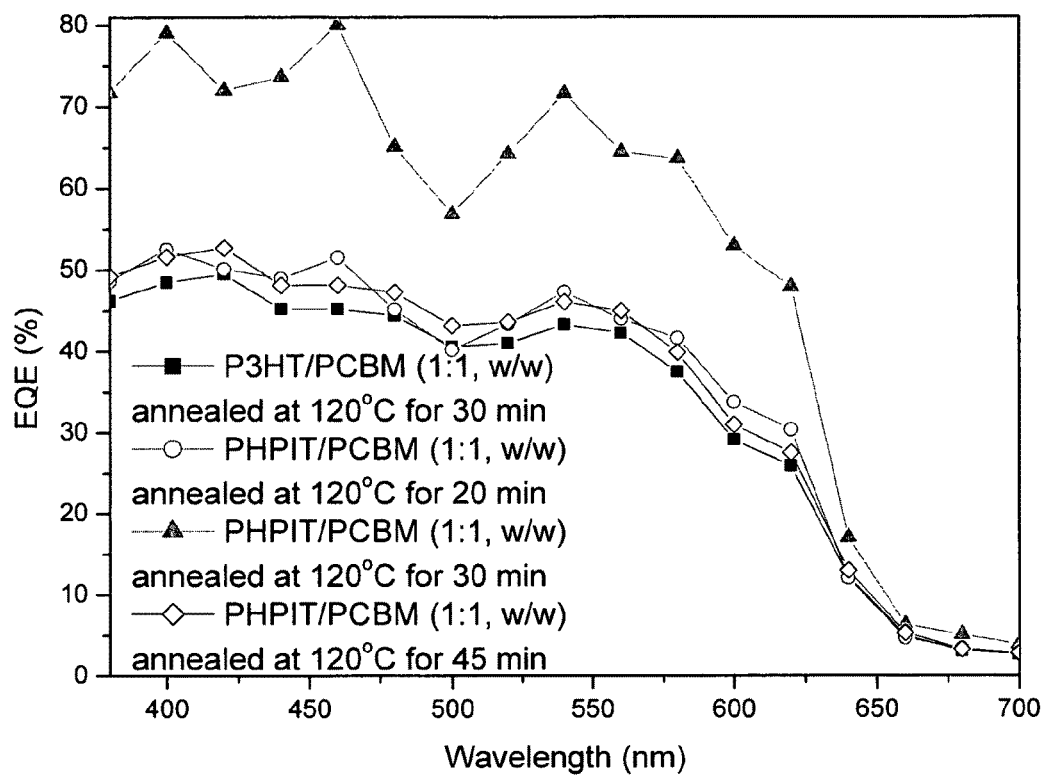
FIG. 3 is a relationship diagram of wavelength versus EQE, which describes the comparison for the embodiment of the present invention and the conventional P3HT/PCBM.

FIG. 3 is a relationship diagram of wavelength versus external quantum efficiency (EQE), which describes the comparison for the embodiment of the present invention and the conventional P3HT/PCBM. It is understood from the diagram that the EQE of PHPIT/PCBM of the present invention is higher than that of the conventional P3HT/PCBM. It is the most significant case when the temperature is kept for 30 minutes. According to the above-mentioned description, the solvability for the embodiment of the present invention is very well, which can raise the value of fill factor (FF). Moreover, the internal charge separation ability and the visible light absorption ability of polymer are increased, thus the photovoltaic conversion efficiency is improved.

Figure 4A:
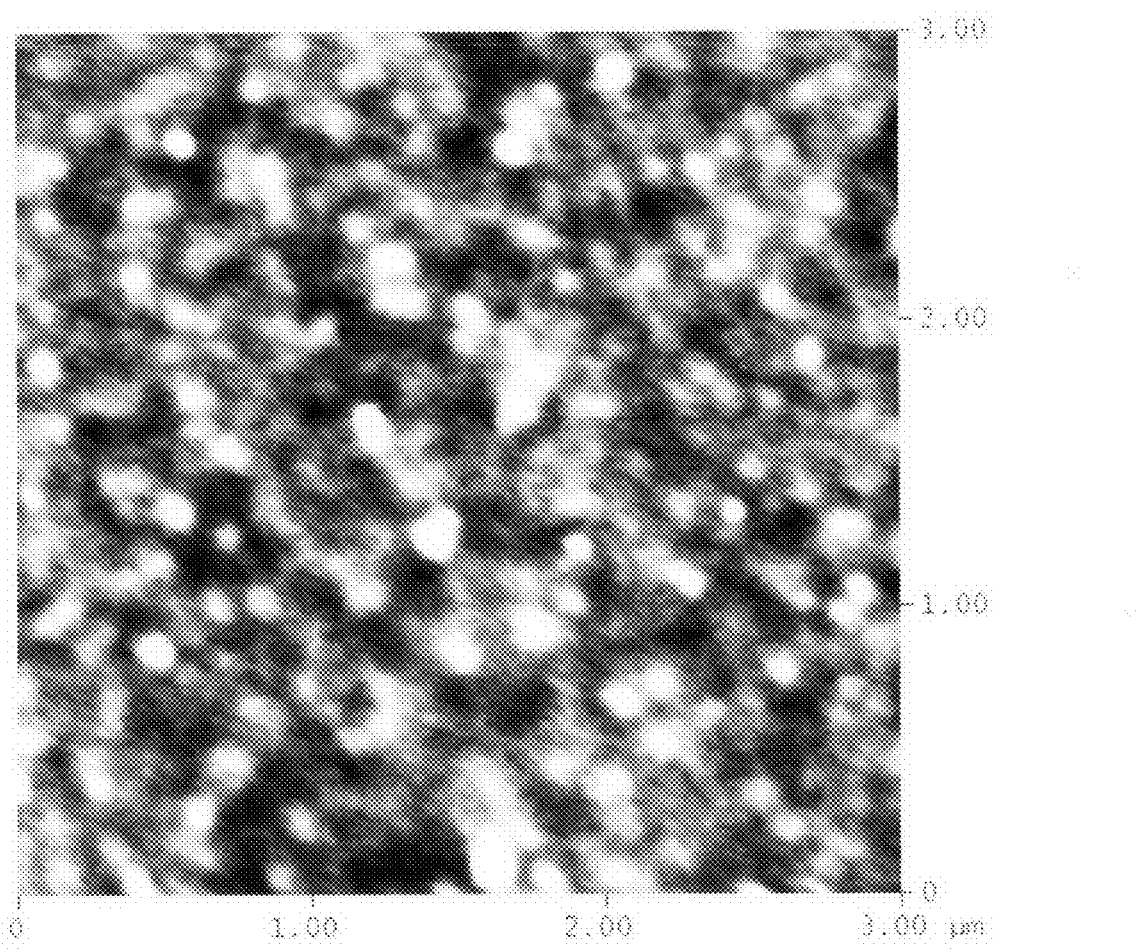
FIGS. 4A, FIG. 4B and FIG. 4C show the image of PHPIT/PCBM film taken by the atomic force microscope under 20, 30, and 45 minutes, respectively.
Figure 4B:
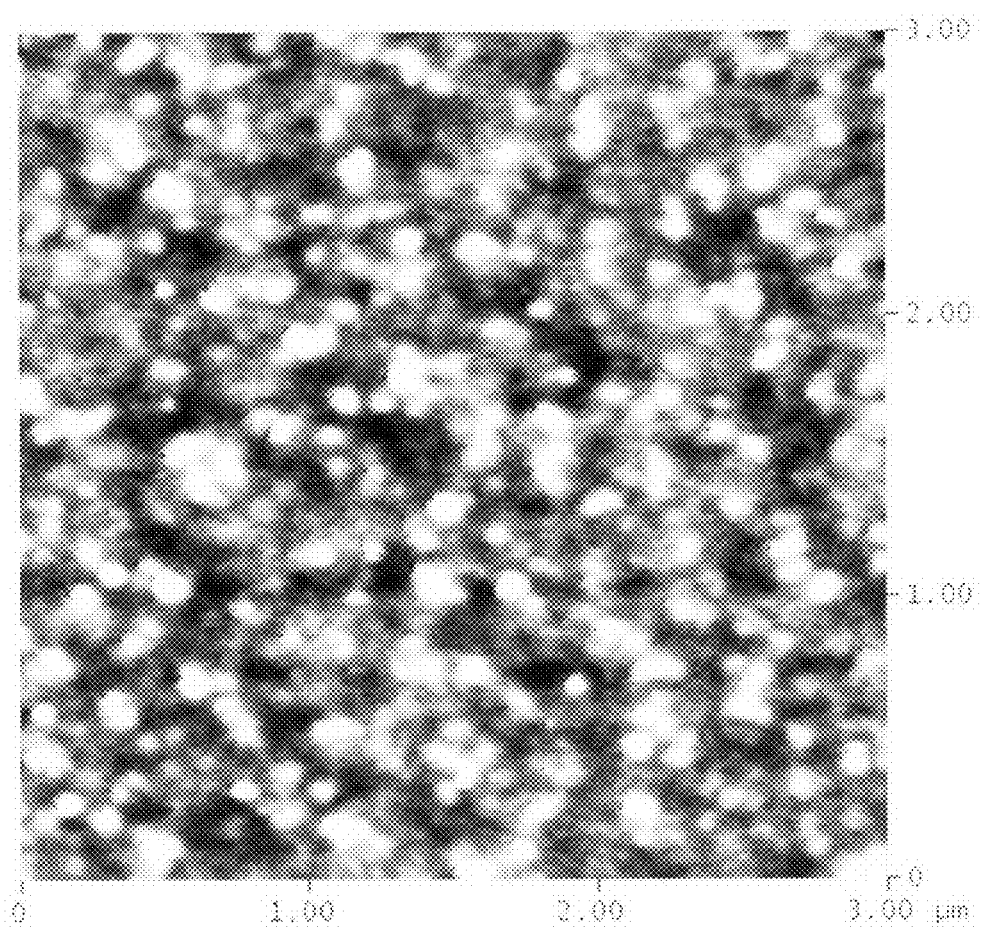
Figure 4C:
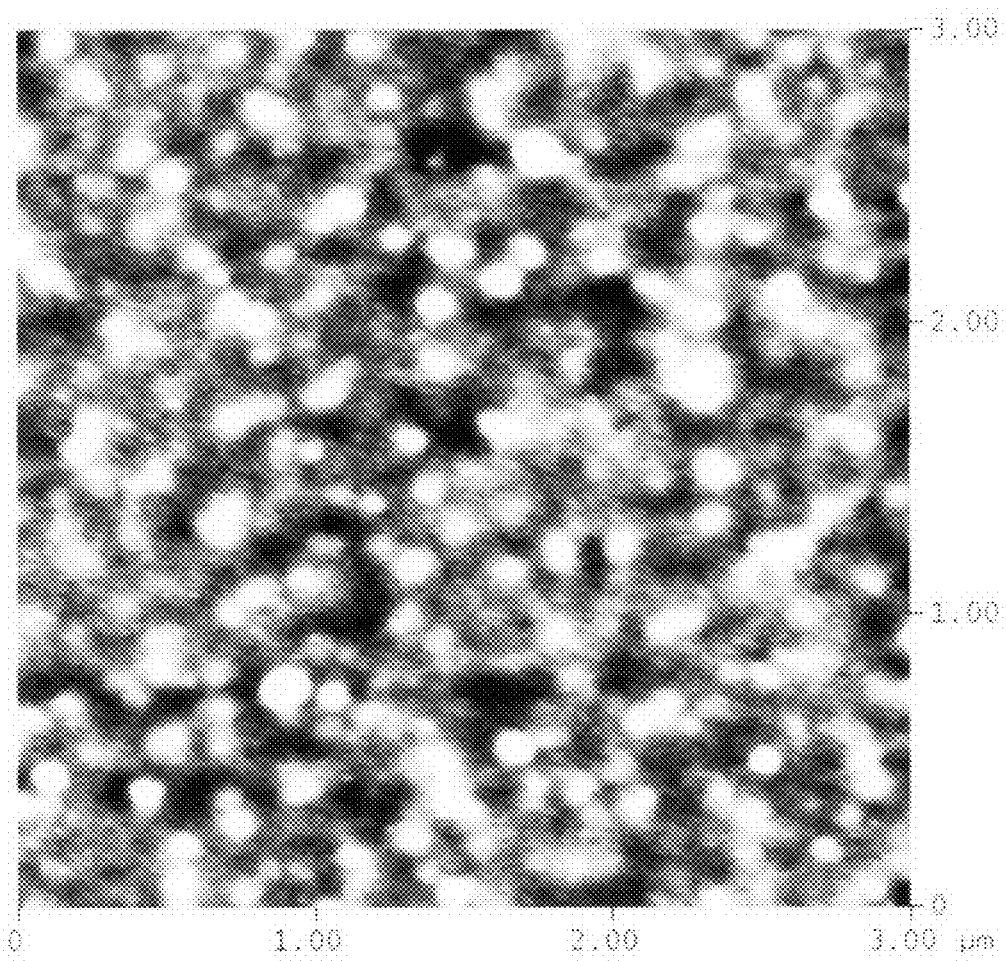

FIG. 4A, FIG. 4B and FIG. 4C show the image of PHPIT/PCBM film taken by the atomic force microscope under 20, 30, and 45 minutes, respectively. When the temperature is kept for 30 minutes, the R.M.S. roughness is increased to 2.27, which describes the possibility for the increase of internal light absorption of the component.

FIG. 5 shows the electron mobility, hole mobility, and their ratio of PHPIT/PCBM and P3HT/PCBM for different temperature keeping time. It is shown when more-balanced electron and hole mobility is achieved, a higher short-circuit current density will be produced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for fabricating organic polymer of solar cell, comprising:
    reacting 3,6-dibromophenanthrene-9,10-dione with 3-thiophenecarboxaldehyde, 4-hexylaniline, ammonium acetate and acetic acid to form as a Compound 1;
    reacting the Compound 1 with hexyl magnesium bromide and Ni(dppp)Cl$_2$ to form as a Compound 2;
    reacting the Compound 2 with N-bromosuccinimide (NBS), tetrahydrofuran (THF), and acetic acid to form a 2-(2,5-dibromothiophen-3-yl)-6,9-dihexyl -1-(4-hexylphenyl)-1H-phenanthro[9,10-d]-imidazole (HPIT); and
    reacting the HPIT with tetrahydrofuran, methyl magnesium bromide and Ni(dppp)Cl$_2$ to form the organic polymer of solar cell.

2. The method according to claim 1, wherein the polymer comprises polythiophene derivative polymer.

3. The method according to claim 2, wherein the polythiophene derivative polymer comprises a polythiophene substituted with pendant groups comprising hexylphenanthrenyl-1,3-imidazole.

4. The method according to claim 2, wherein the polythiophene derivative polymer comprises PHPIT (poly(hexylphenanthrenyl-imidazole thiophene)).

* * * * *